United States Patent
Stroeks et al.

(10) Patent No.: US 10,406,788 B2
(45) Date of Patent: Sep. 10, 2019

(54) CO-EXTRUDED FILM

(71) Applicant: DSM IP ASSETS B.V., Heerlen (NL)

(72) Inventors: Alexander Antonius Marie Stroeks, Echt (NL); Hao Chen, Echt (NL); James Calvin Miller, Echt (NL)

(73) Assignee: DSM IP ASSSETS B.V., Heerlen (NL)

( * ) Notice: Subject to any disclaimer, the term of this patent is extended or adjusted under 35 U.S.C. 154(b) by 0 days.

(21) Appl. No.: 15/746,075

(22) PCT Filed: Aug. 4, 2016

(86) PCT No.: PCT/EP2016/068655
§ 371 (c)(1),
(2) Date: Jan. 19, 2018

(87) PCT Pub. No.: WO2017/021496
PCT Pub. Date: Feb. 9, 2017

(65) Prior Publication Data
US 2018/0207913 A1    Jul. 26, 2018

Related U.S. Application Data

(60) Provisional application No. 62/200,794, filed on Aug. 4, 2015.

(30) Foreign Application Priority Data

Aug. 4, 2015    (EP) ..................................... 15179615

(51) Int. Cl.
| | |
|---|---|
| B32B 7/02 | (2019.01) |
| B32B 27/08 | (2006.01) |
| B32B 7/12 | (2006.01) |
| B32B 27/32 | (2006.01) |
| B32B 27/34 | (2006.01) |
| B32B 27/30 | (2006.01) |
| B29C 39/20 | (2006.01) |
| B29C 39/22 | (2006.01) |
| B29C 49/22 | (2006.01) |
| B29C 49/42 | (2006.01) |
| B29K 23/00 | (2006.01) |
| B29K 77/00 | (2006.01) |
| B29K 105/00 | (2006.01) |
| B29L 7/00 | (2006.01) |
| B29L 9/00 | (2006.01) |

(52) U.S. Cl.
CPC .............. *B32B 27/08* (2013.01); *B32B 7/12* (2013.01); *B32B 27/306* (2013.01); *B32B 27/32* (2013.01); *B32B 27/34* (2013.01); *B29C 39/203* (2013.01); *B29C 39/22* (2013.01); *B29C 49/22* (2013.01); *B29C 49/4273* (2013.01); *B29C 2049/227* (2013.01); *B29K 2023/06* (2013.01); *B29K 2023/086* (2013.01); *B29K 2023/12* (2013.01); *B29K 2077/00* (2013.01); *B29K 2105/0002* (2013.01); *B29K 2105/0085* (2013.01); *B29K 2995/0041* (2013.01); *B29K 2995/0067* (2013.01); *B29K 2995/0097* (2013.01); *B29L 2007/008* (2013.01); *B29L 2009/00* (2013.01); *B32B 2250/24* (2013.01); *B32B 2270/00* (2013.01); *B32B 2307/406* (2013.01); *B32B 2307/412* (2013.01); *B32B 2439/70* (2013.01)

(58) Field of Classification Search
CPC ..................... B29C 2049/227; B29C 39/203; B29C 39/22; B29C 49/22; B29C 49/4273; B32B 2250/24; B32B 2270/00; B32B 2307/406; B32B 2307/412; B32B 2439/70; B32B 27/08; B32B 27/306; B32B 27/32; B32B 27/34; B32B 7/12

See application file for complete search history.

(56) References Cited

U.S. PATENT DOCUMENTS

| | | | |
|---|---|---|---|
| 4,855,183 A * | 8/1989 | Oberle | ............... B32B 27/16 428/345 |
| 5,480,690 A | 1/1996 | Stenger et al. | |
| 2012/0215196 A1 | 8/2012 | Kobayashi et al. | |

FOREIGN PATENT DOCUMENTS

| | | |
|---|---|---|
| CN | 102596144 | 7/2012 |
| DE | 44 38 546 | 5/1996 |
| EP | 2 111 979 | 10/2009 |
| EP | 2 796 290 | 10/2014 |
| EP | 2 848 390 | 3/2015 |

OTHER PUBLICATIONS

International Search Report and Written Opinion of the ISA for PCT/EP2016/068655, dated Oct. 11, 2016, 11 pages.

* cited by examiner

*Primary Examiner* — Lawrence D Ferguson
(74) *Attorney, Agent, or Firm* — Nixon & Vanderhye P.C.

(57) ABSTRACT

The invention relates to a co-extruded film comprising a sealing layer of low density polyethylene and a skin layer, wherein the skin layer comprises a copolyamide which comprises: •At least 75 wt % monomeric units derived from caprolactam; •Between 5 to 25 wt % monomeric units derived from a diamine and terephthalic acid; wherein the weight percentage is with respect to the total weight of copolyamide in the skin layer. The invention also relates to a process for preparing such a film, as well as applications of the film.

18 Claims, 1 Drawing Sheet

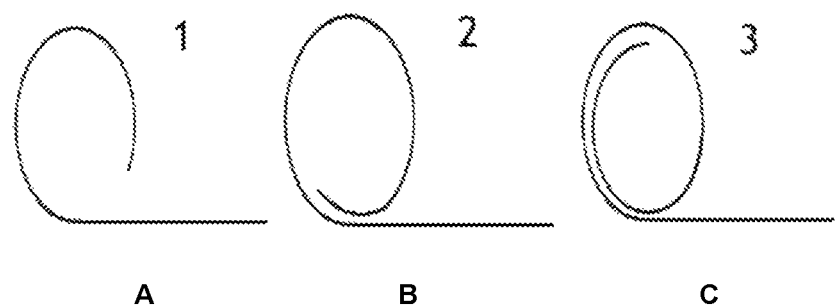

CO-EXTRUDED FILM

CROSS-REFERENCE TO RELATED APPLICATIONS

This application is the U.S. national phase of International Application No. PCT/EP2016/068655 filed Aug. 4, 2016, which designated the U.S. and claims priority to EP Patent Application No. 15179615.8 filed Aug. 4, 2015, and benefit to U.S. Provisional Application No. 62/200,794 filed Aug. 4, 2015, the entire contents of each of which are hereby incorporated by reference.

FIELD

This invention relates to a co-extruded film, suitable for e.g. food-packaging, a method for preparing such a film, as well as applications thereof. Co-extruded films are known and are widely used in packaging, for example as lidding film and pouch film.

BACKGROUND AND SUMMARY

Co-extruded films have a number of functional requirements, which includes barrier properties against gases, such as oxygen, puncture resistance, sealability, printability, as well as retort resistance.

Moreover, packaging is becoming more and more important as a communication tool for food companies and brand owners to convey product messages to consumers. Transparency, as well as higher gloss becomes critical for a fresh, trendy, appealing product image. Co-extruded films comprise at least a skin layer and a sealing layer. Copolyamide is a known material for skin layer, also called outer layer, as it is co-extrudible with polyethylene, polypropylene as well as ethyl vinyl alcohol, and because it is high temperature resistant during sealing. However, the gloss of the copolyamide is insufficient. This results in a film with dull appearance, which is undesirable. Moreover, asymmetric films may suffer from curling behavior. Curling behavior is the phenomenon that a film deviates from planar geometry, as for example curling into a tube-like structure. This may damage the functionality or appearance of an end product, such as a lidding film on a tray. It may also disrupt a process step upon further processing the film into packaging.

Upon sterilizing or pasteurizing packages containing a packed product and a film, it may happen that the packages adhere to each other, as these packages are often treated while being stacked on top of each other. This is unwanted, as the packages then have to be peeled from each other and may even open up after the sterilizing or pasteurizing process. Packed products may include food such as vegetables, fruit, cheese, meat, as well as non-food stuffs.

It is thus an objective of the present invention to provide a co-extruded film which has better properties making it more attractive to employ in packaging, such as lidding film. This has been achieved by a co-extruded film comprising a sealing layer of a polyolefin and a skin layer, wherein the skin layer comprises a copolyamide which comprises:

At least 75 wt % monomeric units derived from caprolactam;
Between 5 to 25 wt % monomeric units derived from a diamine and terephthalic acid;
wherein the weight percentage is with respect to the total weight of copolyamide in the skin layer.

The sealing layer is a polyolefin, such as for example polyethylene, polypropylene, low density polyethylene (LDPE), linear low density polyethylene (LLDPE). Preferably, the sealing layer is a low density polyethylene. This has the advantage that the melting temperature of LDPE is relatively low, which facilitates sealing.

BRIEF DESCRIPTION OF THE DRAWINGS

FIGS. 1A-1C schematically depict the quantification of curvature into categories 1, 2, or 3 respectively, according to the Examples below.

DETAILED DESCRIPTION

The co-extruded film according to the invention exhibits a higher gloss as exemplified by the examples and less sticking. Moreover, the co-extruded film allows for higher degree of stretching which is advantageous for higher mechanical and barrier properties. Another advantage is that the co-extruded film shows less curling. Curling is understood to be caused by unmatched dimensional change of different material layers during post crystallization as well as after absorbing moisture. The co-extruded film according to the invention can thus be made thinner, as usually middle layers are made thicker to reduce curling.

Co-extruded film is hereby understood to be a multilayer film comprising at least a skin layer and a sealing layer, which has an asymmetric layer structure and is prepared by co-extrusion.

Co-extruded is hereby understood to encompass a process in which at least two layers are connected while being in the melt. Co-extrusion is distinguished from lamination, in which layers are connected while at least one layer is in a solid state.

Middle layer is hereby understood to encompass all layers of the co-extruded film except the skin and the sealing layer. The middle layer is optional and may for example comprise a tie layer, to create better adherence between the skin and sealing layer. Middle layers may also comprise layers such as (co)polyamide (PA) and ethylene vinyl alcohol (EVOH), as these materials have barrier properties against oxygen and flavours. Middle layers may also comprise of substrate layers, such as polypropylene (PP), polyethylene (PE), low density polyethylene (LDPE), linear low density polyethylene (LLDPE), as these materials are advantageous against moisture.

The middle layer may also comprise a tie-layer, which is known to a person skilled in the art. A tie layer may be present between two different material layers to increase adhesion between these two different layers. The co-extruded film may comprise at least three layers: coPA/tie/LDPE, but may also be made of more than three layers, such as coPA/tie/PE/tie/LDPE or coPA/tie/PP/tie/LDPE in order to have a more balanced mechanical and dimensional property as well as cost optimization. The co-extruded film may also comprise an EVOH layer, such as coPA/tie/PA/EVOH/PA/tie/LDPE.

Skin Layer: coPA

The skin layer of the co-extruded film according to the invention comprises a copolyamide which comprises:

At least 75 wt % monomeric units derived from caprolactam;
Between 5 to 25 wt % monomeric units derived from a diamine and terephthalic acid; wherein the weight percentage is with respect to the total weight of copolyamide in the skin layer.

This copolyamide is also referred to as PA-6/XT, whereby the nomenclature is adhered to as presented in Nylon Plastics Handbook, Melvin I. Kohan, 1995, Hanser Verlag, page 5, and wherein X denotes at least one diamine. The skin layer will abbreviated in this specification as coPA, in order to distinguish between other (co)polyamide layers, which may be present in the film according to the invention. General polyamide layers will be abbreviated as PA, and may include copolyamides as well, but are generally composed of PA-6 or PA-66, as these polyamides are readily available.

A diamine is hereby understood to be at least one diamine, and may thus be more than one diamine.

A copolyamide is hereby defined such that the monomers are introduced during polymerization of the polymer. A copolyamide is distinguished from a blend, as a blend is a mixture of polymers per se.

The diamine may be chosen from the group consisting of 1,4 diaminobutane, hexamethylene diamine (HDMA), isophoronediamine (IPD), bis-(p-aminocyclohexane)methane (PACM), 2,2-Di-(4-aminocyclohexyl)-propane, 3,3'-dimethyl-4 diaminodicyclohexylmethane, p-xylylenediamine, m-xylylenediamine, and 3,6-bis(aminomethyl)norbornane as well as mixtures thereof. Preferably, the diamine is hexamethylene diamine, as this diamine is readily available. The copolaymide containing hexamethylene diamine and terephthalic acid (T) is also denoted as PA-6/6T. PA-6/6T is a copolyamide, in which the majority of monomeric units is derived from caprolactam, hence the first 6 in PA-6/6T. The minority is derived from hexamethylene diamine, hence the second 6, and terephthalic acid, abbreviated as T.

Preferably, the monomeric units derived from the diamine and terephthalic acid are present in substantially equimolar amounts. More preferably, the polyamide comprises 5 to 15 wt % monomeric units derived from the diamine and terephthalic acid, more preferably between 7 and 11 wt %, wherein weight percentage is given with respect to the total weight of polyamide in the skin layer.

Most preferred, the copolyamide comprises at least 89 wt % monomeric units derived from caprolactam, and between 7 and 11 wt % of monomeric units derived from hexamethylene diamine and terephthalic acid, wherein hexamethylene diamine and terephthalic acid are present in substantially equimolar amounts, wherein weight percentage is given with respect to the total weight of copolyamide in the skin layer.

The thickness of the skin layer may be between 2 and 50 micron, preferably between 2 and 25 micron, and usually is between 5 to 45 wt % with respect to the total weight of the co-extruded film. Preferably, the skin layer is between 8 to 15 wt % with respect to the total weight of the co-extruded film, as a lower content of skin layer exhibits less curling.

Surprisingly, already these low amounts of monomeric units derived from the diamine and terephthalic acid exhibit a high gloss in the co-extruded film according to the invention. This has the advantage that less foreign material has to be present in the copolyamide, which is crucial for food contact approval. Compared with other known copolyamides such as PA-6/66, the film according to the invention has improved oxygen barrier especially under higher humidity condition, less dimensional change after absorbing moisture and lower haze. Moreover the film according to the invention will not adhere to each other after retorting process.

The skin layer preferably comprises at least 90 wt % of the copolyamide, wherein the weight percentage is given with respect to the total weight of the skin layer, more preferably at least 95 wt % and even more preferred at least 98 wt %. The skin layer may even consist of the copolyamide, thus 100 wt % of copolyamide.

Tie Layer (Tie)

The skin layer and seal layer are preferably connected via a tie layer, also known as adhesive layer, in order to increase adhesion. If the co-extruded film has more than three layers, then the co-extruded film may comprise several tie layers in order to increase adhesion between the various layers.

Examples of suitable materials for these tie layers are so-called tie resins. Tie resins include modified polyolefins, such as LDPE, LLDPE, metallocene PE, polyethylene-vinyl alcohol, polyethylene-acrylic acid, polyethylene-methacrylic acid and polypropylene, that are grafted with at least one compound chosen from the group of α,β-unsaturated dicarboxylic acids, for example maleic acid, fumaric acid and itaconic acid and anhydrides, acidic esters, acidic imides and acidic imines thereof. Modified copolymers of ethylene and the aforementioned dicarboxylic acids may also be applied as tie resin.

Treatment of Film

Optionally, the co-extruded film according to the invention may be further treated by printing and/or metallization on the skin layer or coating such as anti-fogging on the sealing layer.

Film Properties

The co-extruded film according to the invention exhibits higher gloss and shows puncture resistance, barrier properties against gasses, such as oxygen, sealablity and printability. The co-extruded film can advantageously be used for retorting packaging. The co-extruded film according to the invention exhibits higher gloss, even in the case the co-extruded film is not immediately quenched at a temperature of about less than 50° C. with water or cold chill roll after the extrusion die.

The co-extruded film thickness may vary and depends on the number of layers, as well as production process. Stretched film is usually thinner, as compared to unstretched film. The co-extruded film thickness may be between 10 and 600 micron, preferably between 15 to 300 micron and more preferred between 20 to 150 micron.

Gloss Values

The co-extruded film according to the invention exhibits higher gloss as compared to a film in which the skin layer is made of a polyamide of 100 wt % monomeric units derived from caprolactam.

Application of the Co-extruded Film

The co-extruded film according to the invention can be used as lidding film or pouch film and is especially suitable for packing content that for example needs longer shelf life, such as for example meat, cheese, fish. The co-extruded film according to the invention is also suitable for retort packaging. The co-extruded film according to the invention is moreover suitable for packing content that requires high oxygen, moisture and flavor barrier such as coffee, snacks, and biscuits, as well as medicaments.

Method of Preparing the Film

The co-extruded film according to the invention may be prepared by multiple methods, including blown or cast film process and may optionally be followed by mono- or biaxial stretching. Blown film process includes air or water quenched unstretched process known as one bubble processes; and water quenched stretched process known as double or triple bubble process. Preferably as blown film process air quenched unstretched or water quenched stretched triple bubble process is used, as such process allows for films reaching higher end level of crystallinity which can bring higher barrier, dimensional stability as well as better mechanical properties The co-extruded film may also be prepared by cast film process, and may thereafter be stretched in one or more directions. Stretching has the advantage that co-extruded film can be significantly down-gauged while still maintain very good barrier and mechanical properties.

EXAMPLES

The following (co) polyamides were prepared:
PA-6/6T with 10 wt % 6T

A 10 L autoclave at room temperature was charged with 3.315 kg of solid ε-caprolactam and was inertisized three times with $N_2$ and subsequently heated to 80° C. In a separate vessel 271 g of T powder was suspended in 840 kg ε-caprolactam and then added to the autoclave. Subsequently 190 g of hexamethylene diamine (HMDA) was dissolved in 200 g water at 70° C. and charged to the autoclave. The autoclave was closed and the mixture was heated up to 270-275° C. and kept under pressure for 2 hours. The pressure was slowly released to 0 barg, while the temperature was kept at 270° C. The mixture remained at 270° C. in this postcondensation phase for 6 hours while degassing, before the reactor was emptied and the extruded string was granulated. The unextracted granules had a relative solution viscosity in sulphuric acid of 2.71. The obtained granules were three times extracted for three hours with water at 100° C. to remove the residual monomers and oligomers. In a static bed reactor, the extracted granules were dried and postcondensed for 20 hours at 155° C. under an $N_2$ stream of 35 $m^3$/h. The solid state postcondensed granules had a relative solution viscosity in sulphuric acid of 4.0.

PA-6/IPDT with 5 wt % of IPDT

A 2 L autoclave equipped with oil heating and stirrer was charged with 752 gram ε-caprolactam, 8 gram ε-aminocaproic acid, 20.25 gram isophoronediamine, 19.75 gram terephthalic acid and 12 gram of demineralised water. Oxygen was removed from the autoclave by pressurizing three times with nitrogen to 10 barg and releasing the nitrogen pressure to 0 barg. The autoclave was completely closed, heated to melt the ε-caprolactam, and at 80° C. slowly stirred. The reactor was heated to 265° C. in approximately 1 hour. At this temperature the polymerization was continued for 2 hours, during which a pressure of 5 barg is obtained. The pressure was slowly released to 0 barg and a nitrogen flow was set on the autoclave. Polymerization was continued for 4 hours and a turning moment 3.4 Nm at 15 RPM was obtained. The polymer was discharged from the autoclave via the bottom valve set at 280° C. and collected as a strand that was cooled in a water bath. The polymer strand was granulated. The collected granules were three times extracted with demineralised water (ratio 1:20) at 100° C. for 1 hours. The polymer was dried at 80° C. in an oven at 200 mbara with nitrogen purge. The polymer had a relative viscosity in 90% formic acid at 1.0 w % of 3.21.

Comparative PA-6

A 10 L autoclave at room temperature was charged with 6.0 kg of solid c-caprolactam and 90 g water and was inertisized three times with $N_2$. The autoclave was closed and the mixture was heated up to 270-275° C. and kept under pressure for 2 hours. The pressure was slowly released to 0 barg, while the temperature was kept at 270° C. The mixture remained at 270° C. in this postcondensation phase for 6 hours while degassing, before the reactor was emptied and the extruded string was granulated. The unextracted granules had a relative solution viscosity in sulphuric acid of 3.0. The obtained granules were three times extracted for three hours with water at 100° C. to remove the residual monomers and oligomers. In a static bed reactor, the extracted granules were dried and postcondensed for 14 hours at 160° C. under an $N_2$ stream of 35 $m^3$/h. The solid state postcondensed granules had a relative solution viscosity in sulphuric acid of 3.5.

Comparative PA-6/66 with 15 wt % 66

A 10 L autoclave at room temperature was charged with 4.559 kg of solid ε-caprolactam and 90 g water and was inertisized three times with $N_2$ and subsequently heated to 90° C. In a separate vessel 807 g of 66-salt was dissolved in 540 g water at 90° C. and subsequently charged to the autoclave. The autoclave was closed and the mixture was heated up to 270-275° C. and kept under pressure for 2 hours. The pressure was slowly released to 0 barg, while the temperature was kept at 270° C. The mixture remained at 270° C. in this postcondensation phase for 6 hours while degassing, before the reactor was emptied and the extruded string was granulated. The unextracted granules had a relative solution viscosity in sulphuric acid of 2.8. The obtained granules were three times extracted for three hours with water at 100° C. to remove the residual monomers and oligomers. In a static bed reactor, the extracted granules were dried and postcondensed for 16 hours at 160° C. under an $N_2$ stream of 35 $m^3$/h. The solid state postcondensed granules had a relative solution viscosity in sulphuric acid of 3.5.

In order to measure film properties, monolayer films were prepared of the materials as described above and denoted in Table 1 in order to simulate these materials as skin layer. Films were made on the Collines lab scale film extrusion lines.

TABLE 1

| | Material specification | Film specification |
|---|---|---|
| Sample 1.1 according to invention | PA-6/6T copolymer with 10 wt % 6T equimolar amounts | 50 μm blown film (air cooled) |
| Sample 1.2 comparative example | PA-6/66 copolymer with 15 wt % 66 | 50 μm blown film (air cooled) |
| Sample 1.3 comparative example | PA-6 homopolymer | 50 μm blown film (air cooled) |
| Sample 2.1 according to the invention | PA-6/6T copolymer with 10 wt % 6T equimolar amounts | 100 μm cast film (chill roll cooled*) |
| Sample 2.2 comparative example | PA-6/66 copolymer with 15 wt % 66 | 100 μm cast film (chill roll cooled*) |
| Sample 2.3 comparative | PA-6 homopolymer | 100 μm cast film (chill roll cooled*) |

*Cooling temperature 100° C.

Besides monolayers, also coextruded multilayer cast films were produced to study curl performance. It concerns trilayer films with a LLDPE (commercial grade Sabic LLDPE318BE) layer on one side, a polyamide or copolyamide layer on the other side and a functionalized LLDPE based tie-layer (commercial grade Yparex 9603) in between. In the film cast process, the tri-layer melt was cooled with the polyamide or copolyamide layer making contact with a chill role of 100° C. The total thickness of the film was 65 μm consisting of 30 μm LLDPE layer, 5 μm tie-layer and 30 μm PA or copolyamide layer. The variation in these tri-layer film samples was the type of polyamide used, as becomes clear from the next table. Directly after film production, the films were stored for a week in sealed alumina bags in order to prevent moisture uptake.

Coextruded multilayer tri-layer cast film with PA-6/IPDT with 5 wt % IPDT equimolar amounts in the 30 μm PA layer is prepared and similar results are expected as compared to PA-6/6T with 10 wt % 6T equimolar amounts in the 30 μm PA layer.

TABLE 2

| | Polyamide material specification in tri-layer film in 30 μm PA layer |
|---|---|
| Sample 3.1 According to invention | PA-6/6T copolymer with 10 wt % 6T equimolar amounts |
| Sample 3.2 Comparative | PA-6/66 copolymer with 15 wt % 66 |
| Sample 3.3 Comparative | PA-6 homopolymer |

The curl of the co-extruded multilayer films was quantified by visual inspecting the macroscopic geometry of a piece of film with a typical surface area of 16*16 cm². This piece of film was positioned at a table; precautions were taken (eg grounding of table) in order to exclude any antistatic effects. The films showed a certain curvature out of its plane in one lateral direction. The film was inspected in side view in the in plane direction perpendicular to this lateral direction. This curvature was quantified into the following categories, as presented in FIGS. 1A-1C.

As shown in FIGS. 1A-1C, a mark 1, 2 or 3 was given to quantify the level of curvature according to the side views specified in the above graphs. A mark 3 (FIG. 1C) is a more severe curl than a mark 2 (FIG 1B) while a mark 2 is more severe compared to mark 1(FIG 1A). A mark >3 is given for a film with a more severe curl as mark 3. When the curl is less than mark 1 the curl is indicated by an estimate of the angle of one end of the film compared to the other end as inspected in side view. When the film is completely planar, the remark "no curl" is given.

It was also specified whether the curvature was towards the LLDPE (LLDPE at the inside part of the curl) or the PA (PA at the inside part of the curl) part of the film.

The evaluation of the curl was performed directly after film production (before putting films in sealed bags). Another measurement was done after storage of the films on a roll in a closed alumina bag, preventing moisture uptake from the surrounding atmosphere, for several days at room temperature. Directly after taking the film out of the bag, the experiment was performed. Yet another measurement was done after storage of the films in an alumina bag for several days and subsequent water treatment for 3 hours at 80° C. of the films to mimic the pasteurization process that is often employed to packed food. The films were taken out of the alumina bags and put in a water bath for 3 hours at 80° C. The films were taken out of the water bath, liquid water at the surface of the films was wiped off and directly afterwards the curl was quantified.

TABLE 3

| | Curl results | | |
|---|---|---|---|
| | Curl quantification Direct after film production | Curl quantification After storage in alumina bags | Curl quantification After storage in alumina bags and water treatment 3 hrs 80° C. |
| Sample 3.1 according to the invention | 3, towards LLDPE | No curl | 1, towards PA |
| Sample 3.2 comparative | 3, towards LLDPE | Angle 45° towards PE | 1, towards PA |
| Sample 3.3 comparative | 3, towards LLDPE | >3, towards LLDPE | >3, towards LLDPE |

Directly after film production, all samples show a strong curl towards PE. However, after storage and after storage and water treatment the PA copolymer containing multilayer films (samples 3.2 and 3.3) show more favorable behavior compared to the PA6 homopolymer containing multilayer film: the curling is less. Sample 3.1 is superior to sample 3.2 since it shows no curl at all after storage.

In order to measure adhesion of two films after a sterilization process, the following experiments were performed on the film samples 1.1, 1.2 and 1.3 to simulate the behavior of the film when used in a package under stacked conditions. Films were cut to obtain lateral film areas of 19.6 cm² (disc with 5 cm diameter). Two film samples were positioned on top of each other (sandwich) and placed in a water-filled autoclave for 1 hr at 130° C. During that hour the sandwiched film construction were pressed by a metal part under gravitational force of 1.2 kg (appr. 12 N). After taking the films out of the autoclave, the adhesion between the two films was determined by peeling the film apart from each other manually.

The films of sample 1.2 (PA-6/66-film) showed a relative high adhesion upon peeling. Tear of the individual films was observed indicative of a high adhesion value between the two films. The adhesion of films of sample 1.1 showed little adhesion towards each other. Films were rather easy to peel without tearing. The films of sample 1.3 (PA-6 film) showed no adhesion, films spontaneously fall apart.

Combination of the experimental curling and adhesion results learns that films based on polyamide PA-6/6T copolymer with 10 wt % 6T equimolar amounts are superior over films containing PA6 homopolymer and PA-6/66 copolymer with 15 wt % 66. Superiority over PA6 homopolymer is based on superior curling behavior. Superiority over PA-6/66 copolymer with 15 wt % 66 is based on much lower adhesion values in combination with slightly better curl behavior.

For lidding-film, in which less curl and no adhesion is important, especially, when a package is subjected to pasteurization or sterilization, the coextruded film according to the invention shows the best combination of properties.

Gloss was measured on 50 μm blown film according to ASTM D2457-13 at 23° C., 50% relative humidity (RH). Results are presented in table 4.

TABLE 4

Gloss results

| | Gloss at different angles | | | |
| --- | --- | --- | --- | --- |
| | 45° | 20° | 60° | 85° |
| Sample 1.1 according to invention | 56.0 | 170.4 | 158.4 | 115.6 |
| Sample 1.2 comparative | 48.8 | 117.2 | 136.4 | 104.2 |
| Sample 1.3 comparative | 37.4 | 82.9 | 113.8 | 100.0 |

The film made of PA-6/6T showed a clear step up in terms of gloss, as the values at various angles were higher as compared to a film made of PA-6 homopolymer or PA-6/66. Co-extruded films with PA6/6T as skin layer are expected to have similar gloss values as compared to the films as prepared above.

Haze was measured on 100 μm cast film according to ASTM D1003 at 23° C., 50% relative humidity. Results are presented in table 5:

TABLE 5

Haze results

| | Haze % |
| --- | --- |
| Sample 2.1 according to invention | 1.5 |
| Sample 2.2 comparative | 2.3 |
| Sample 2.3 comparative | 9.5 |

The film made of PA-6/6T showed a significant lower haze value, as compared to a film made of PA-6 homopolymer or PA-6/66. Co-extruded films with PA6/6T as skin layer are expected to show a similar trend as compared to PA-6 or PA-6/66 as skin layer, in view of haze values.

Oxygen barrier was measured on 100 μm cast film according to ASTM F2714 at 23° C., at 0% and 80% RH. Results are presented in table 6:

TABLE 6

Oxygen barrier results

| | Oxygen barrier cc * mm(m₂ * day) | |
| --- | --- | --- |
| | 0% RH | 85% RH |
| Sample 2.1 according to invention | 1.4 | 1.9 |
| Sample 2.2 comparative | 1.5 | 2.6 |
| Sample 2.3 comparative | 1.2 | 2.0 |

The film made of PA-6/6T showed a similar oxygen barrier as compared to a film made of PA-6 and PA-6/6 at 0% relative humidity. However, at high humidity (85%) the film made of PA-6/6T showed a similar oxygen barrier as compared PA-6, but significant lower as compared to PA-6/66. Co-extruded films in which the skin layer is made of PA-6/6T are expected to show a similar trend towards oxygen barrier.

Surprisingly, the film shows very little curling, in combination with low sticking and high gloss. This makes this film an ideal candidate to be used for packaging.

The invention claimed is:

1. A co-extruded film comprising:
   (i) a sealing layer of a polyolefin,
   (ii) a skin layer; and
   (iii) a tie layer which connects the skin layer and the sealing layer, wherein
   the skin layer comprises a copolyamide in an amount of at least 95 wt. % with respect to total weight of the skin layer, wherein the copolyamide comprises, based on total weight of the copolyamide in the skin layer:
   (a) at least 75 wt % monomeric units derived from caprolactam; and
   (b) between 5 to 25 wt % monomeric units derived from a diamine and terephthalic acid; wherein the weight percentage is with respect to the total weight of copolyamide in the skin layer, and wherein
   the tie layer is comprised of a modified polyolefin grafted with at least one compound selected from the group consisting of α,β-unsaturated dicarboxylic acids and anhydrides, acidic esters, acidic imides and acidic imines thereof.

2. The co-extruded film according to claim 1, wherein the polyolefin of the sealing layer is low density polyethylene (LDPE).

3. The co-extruded film according to claim 1, wherein the diamine is selected from the group consisting of 1,4diaminobutane, hexamethylene diamine (HDMA), isophoronediamine (IPD), bis-(paminocyclohexane)methane (PACM), 2,2-Di-(4-aminocyclohexyl)-propane, 3,3'-dimethyl-4 diaminodicyclohexylmethane, p-xylylenediamine, m-xylylenediamine, and 3,6- bis(aminomethyl)norbornane and mixtures thereof.

4. The co-extruded film according to claim 1, wherein the monomeric units derived from the diamine and terephthalic acid are present in substantially equimolar amounts.

5. The co-extruded film according to claim 1, wherein the amount of monomeric units (b) derived from the diamine and terephthalic acid are present in an amount between 5 to 15 wt %, based on the total weight of copolyamide in the skin layer.

6. The co-extruded film according to claim 1, which further comprises:
   (iv) a barrier layer selected from the group consisting of ethylene vinyl alcohol (EVOH) and (co)polyamides.

7. The co-extruded film according to claim 1, which further comprises a polyolefin layer.

8. The co-extruded film according to claim 1, wherein the skin layer has a thickness of between 2 and 25 micron.

9. The co-extruded film according to claim 1, wherein the co-extruded film has a thickness of between 10 and 600microns.

10. The coextruded film according to claim 9, wherein the co-extruded film has a thickness of between 15 and 300 microns.

11. The co-extruded film according to claim 7, wherein the polyolefin layer is a layer comprised of polyethylene or polypropylene.

12. The co-extruded film according to claim 1, wherein the skin layer is present in an amount between 5 to 45 wt %, based on total weight of the film.

13. The co-extruded film according to claim 1, wherein the tie layer is comprised of a tie resin selected from the group consisting of low density polyethylene (LDPE), linear low density polyethylene (LLDPE), metallocene polyethylene (PE), polyethylene-vinyl alcohol, polyethylene-acrylic acid, polyethylene-methacrylic acid and polypropylene, and wherein the tie resin is grafted with at least one compound selected from the group consisting of α,β-unsaturated dicarboxylic acids and anhydrides, acidic esters, acidic imides and acidic imines thereof.

14. The co-extruded film according to claim 1, wherein
the sealing layer is comprised of linear low density polyethylene (LLDPE), and wherein
the tie layer is comprised of a modified linear low density polyethylene (LLDPE) grafted with at least one compound selected from the group consisting of α,β-unsaturated dicarboxylic acids and anhydrides, acidic esters, acidic imides and acidic imines thereof.

15. A method for preparing the co-extruded film according to claim 1, wherein the method comprises forming the co-extruded film by a blown film process or a cast process.

16. The method according to claim 15, which comprises stretching the co-extruded film.

17. A lidding film which comprises the co-extruded film according to claim 1.

18. A pouch film which comprises the co-extruded film according to claim 1.

* * * * *